United States Patent
Tapia

(10) Patent No.: US 12,117,515 B2
(45) Date of Patent: Oct. 15, 2024

(54) FRACTALET RADAR PROCESSING

(71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 339 days.

(21) Appl. No.: 17/833,083

(22) Filed: Jun. 6, 2022

(65) Prior Publication Data

US 2023/0393257 A1    Dec. 7, 2023

(51) Int. Cl.
    G01S 13/32    (2006.01)
    G01S 7/35     (2006.01)
    G01S 13/34    (2006.01)

(52) U.S. Cl.
    CPC ............ G01S 13/325 (2013.01); G01S 7/354 (2013.01); G01S 13/342 (2013.01); G01S 13/347 (2013.01)

(58) Field of Classification Search
    None
    See application file for complete search history.

(56) References Cited

U.S. PATENT DOCUMENTS

| | | | | |
|---|---|---|---|---|
| 5,285,478 A | * | 2/1994 | Wornell | H04K 3/25 375/259 |
| 5,486,833 A | * | 1/1996 | Barrett | G01S 7/414 342/21 |
| 5,504,487 A | * | 4/1996 | Tucker | G01S 7/417 342/159 |
| 10,775,481 B1 | * | 9/2020 | Puglielli | G01S 13/931 |
| 2003/0182246 A1 | * | 9/2003 | Johnson | H04L 9/001 380/278 |

FOREIGN PATENT DOCUMENTS

| CN | 101436874 A | * | 5/2009 | ........... H04B 1/69 |
| CN | 103236888 A | * | 8/2013 | ........... H04B 17/00 |
| CN | 108614248 A | * | 10/2018 | ........... G01S 7/4052 |

OTHER PUBLICATIONS

G. W. Wornell and A. V. Oppenheim, "Wavelet-based representations for a class of self-similar signals with application to fractal modulation," in IEEE Transactions on Information Theory, vol. 38, No. 2, pp. 785-800, Mar. 1992, doi: 10.1109/18.119736. (Year: 1992).*

* cited by examiner

Primary Examiner — Bernarr E Gregory

(57) ABSTRACT

Processing of a fractalet radio detection and ranging (RADAR) signal is described. A reference fractalet waveform is received. The fractalet waveform includes self-similar waveforms having lower frequency bands and frequency bands. A reflected fractalet waveform received via one or more antennae is decoded. A waveform profile of chirplet transforms of signals in the lower frequency bands within the reflected fractalet waveform are compared to the reference fractalet waveform. Time spans corresponding to the subset of lower frequency bands are determined. Signals from the higher frequency bands are extracted from the reflected fractalet waveform. Chirplet transforms for the extracted signals from the higher frequency bands are determined for the determined time spans. Spatial frequency components along azimuth direction and elevation directions are calculated for targets based on the chirplet transforms for the extracted signals from the higher frequency bands.

21 Claims, 7 Drawing Sheets

FRACTALET RADAR PROCESSING

This application is related to U.S. Non-Provisional patent application Ser. No. 17/833,079, entitled "Fractalet RADAR Waveform Generator", filed on Jun. 6, 2022, the contents of which are incorporated herein by reference in their entirety and for all purposes.

TECHNICAL FIELD

Examples provided herein relate to beamforming for automotive radio detection and ranging (RADAR) sensor systems. More particularly, examples provided herein relate to use of RADAR waveforms that are modeled after a fractal pattern where the waveform at a small scale (i.e., higher frequencies) mimics the behavior of the large-scale components of the waveform (lower frequencies), referred to herein as fractalet signals.

BACKGROUND

Autonomous vehicles, also known as self-driving cars, driverless vehicles, and robotic vehicles, may be vehicles that use multiple sensors to sense the environment and move without human input. The sensors (and sensor systems) can include cameras and/or RADAR systems to provide information about the autonomous vehicle operating environment to control systems of the autonomous vehicle. The RADAR systems include RADAR frequency signal generation architectures.

Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The autonomous vehicles can be used to pick up passengers and drive the passengers to selected destinations. The autonomous vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Current automotive radio detection and ranging (RADAR) sensor systems are designed around single frequency band (e.g., 77-81 GHz) or dual frequency band (e.g., 21-24.5 GHz and 77-81 GHz) architectures. Other frequency bands can be used as frequency bands are generally determined on the bandwidth allocation that provides the necessary spatial resolution.

However, these high frequency bands have limitations that reduce the utility of RADAR technology in, for example, dense, complex scenarios. For example, high frequency RADAR signals provide limited penetration in dense foliage or dense snow. As the frequency of the RADAR waveform increases the ability to penetrate sparse structures (like dense foliage or dense snow) decreases because the waveform is more likely to interact with the granular components of these structures.

As another example, the high frequency RADAR signals may result in higher levels of clutter. As the RADAR signal waveform frequency increases the waveform is more likely to interact with asphalt (e.g., unevenness in the road) and/or concrete structure details (e.g., building corners) to generate higher levels of clutter than can potentially mask targets of interest. Clutter refers to radio frequency (RF) echoes returned from targets in the scene that are not relevant to the purpose of operation of the RADAR sensor system. In the automotive radar system setting this can include, for example, vegetation beyond the vehicle operating environment, precipitation, birds, etc.

In the various examples described below, a RADAR frequency signal processing architecture receives and processes RADAR frequency waveforms containing frequencies with high frequency (e.g., 24 GHz and 77 GHz) and lower frequency (e.g., 2.45 GHz, 5 GHz and 60 GHz IMS bands) that are available for automotive radar system use.

Figure 3:
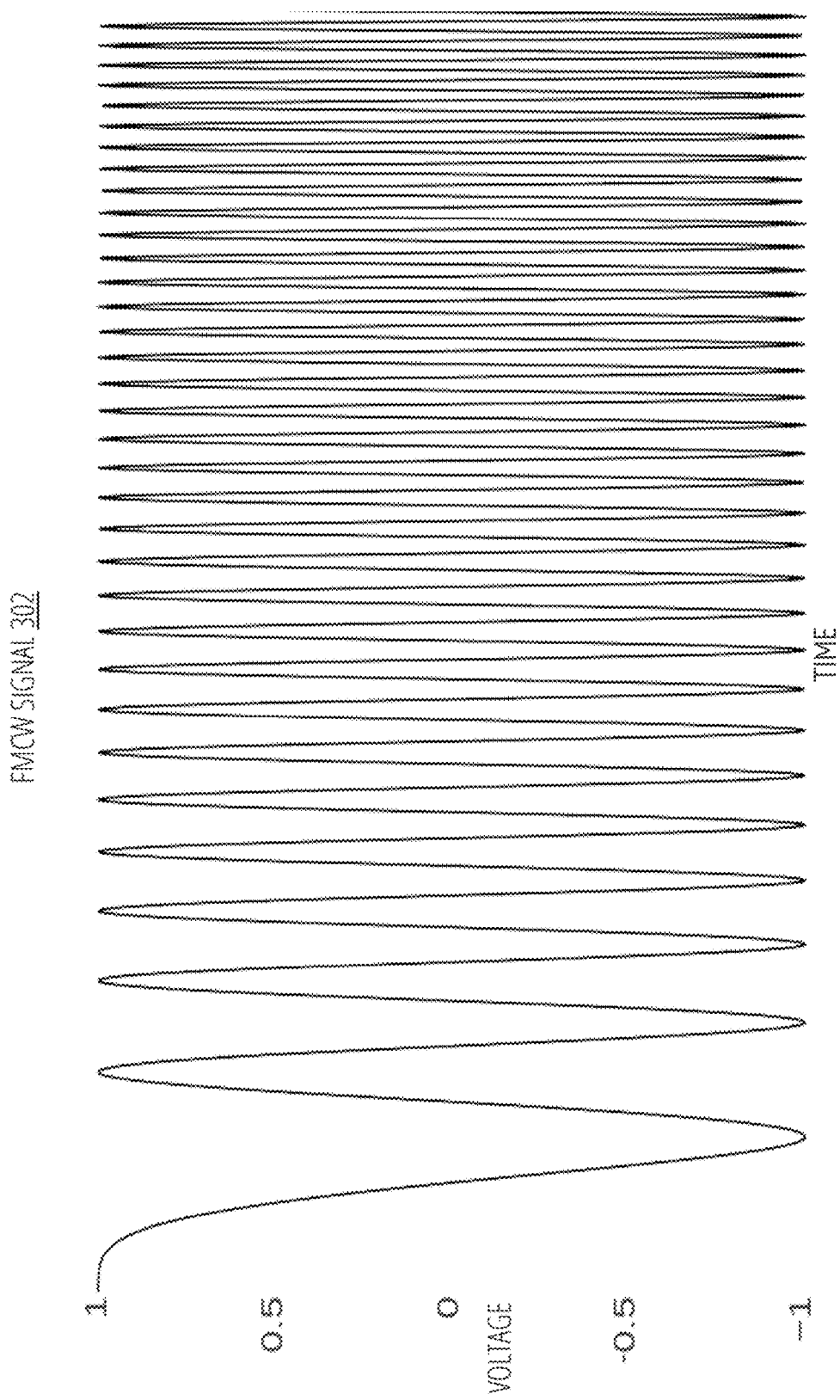
FIG. 3 illustrates an example frequency-modulated continuous wave (FMCW) RADAR signal.
Figure 4:
FIG. 4 illustrates an example fractalet RADAR signal.

In the examples approaches described below, the RADAR waveforms being processed are referred to as "fractalet" waveforms because they are modeled after a fractal pattern where the waveform at a small scale (i.e., higher frequencies) mimics the behavior of the large scale components of the waveform (lower frequencies). An example fractalet RADAR waveform is illustrated in FIG. 4 and, in contrast, an example conventional frequency-modulated continuous wave (FMCW) RADAR signal is illustrated in FIG. 3. The fractalet RADAR waveform includes signals for the various frequency ranges supported with no multiplexing (either in time or in phase).

Compared to previous modulation schemes in which the higher frequency bands are combined with a single lower frequency carrier, the approaches described herein use linear modulation schemes that are mimicked among the different frequency bands. This can provide additional resilience to noise and clutter and can allow a robust detection and external device interference rejection. In the signal processing chain described below, a fractalet RADAR reference signal is provided to the receiver/processing circuitry from, for example, a fractalet RADAR signal generator. This approach is described in greater detail with respect to FIG. 2.

Use of the fractalet RADAR waveforms can allow for improved detection of environmental clutter responses that can cause issues at the higher-frequency bands (e.g., 77 GHz) that can be caused by, for example, vegetation and fence structures. Use of the fractalet RADAR waveforms can also provide improved resilience to external interference due to the presence of multiple frequencies and their self-similarity relationship. Also, due to the lower frequencies that allow for a higher degree of waveform diffraction, the fractalet RADAR waveforms can provide information about partially occluded objections, which provides an overall higher degree of information about the surrounding environment.

Extraction and correlation of the lower frequency components in the signal allow for focusing on high frequency components to determine if the high frequency components correlate with signal centers to be aligned for use in multi-frequency, polyphase filtering banks to calculate frequency phases to locate targets in a scene.

Figure 1:
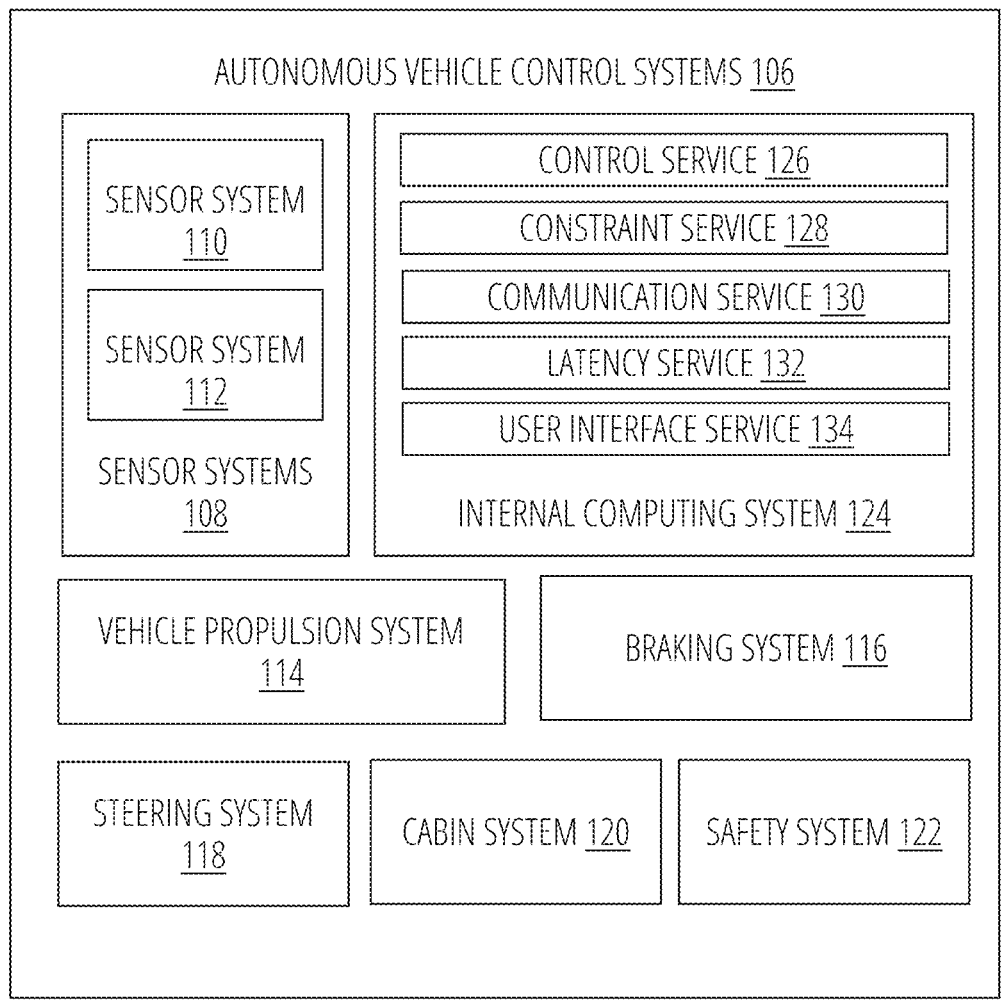
FIG. 1 is a block diagram of an example autonomous vehicle.
Figure 1:
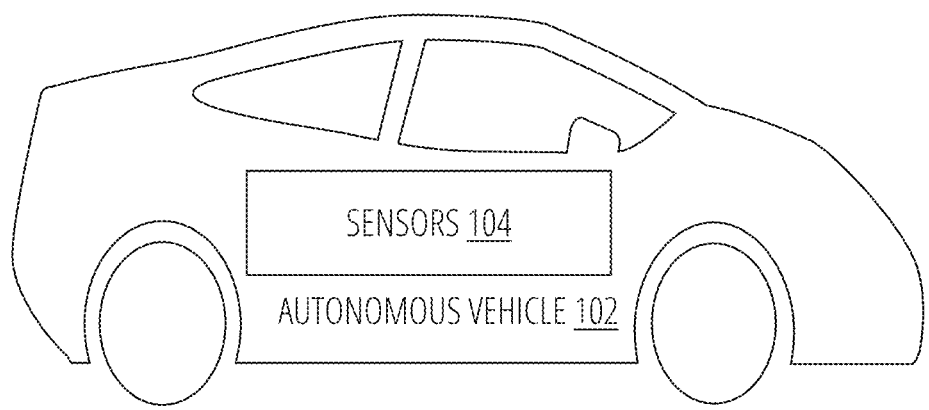

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

In various examples described in greater detail below, one or more of the RADAR systems of autonomous vehicle 102 can utilize fractalet RADAR waveforms to provide information to internal computing system 124 of autonomous vehicle 102 through sensor systems 108. The improved information can be used by internal computing system 124 to control operation of autonomous vehicle 102 via one or more of vehicle propulsion system 114, braking system 116, steering system 118, cabin system 120 and/or safety system 122. In a human-operated vehicle having an advanced driver assistance system (ADAS), the sensor systems can provide feedback and/or control system assistance to the driver based on information gathered by the RADAR system.

Autonomous vehicle 102 can further include mechanical systems to control and manage motion of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. Safety system 122 can include one or more radar systems. Autonomous vehicle 102 can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems can operate in the 77 GHz band (e.g., 76-81 GHz). SRR systems can be used, for example, for blind spot detection or collision avoidance. SRR systems can operate in the 24 GHz band. MRR systems can operate in either the 24 GHz band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120 and safety system 122). Internal computing system 124 includes at least one processor and at least one memory system that can store executable instructions to be executed by the processor. Internal computing system 124 can include any number of computing subsystems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132 and internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132 and user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

In some examples described herein autonomous vehicle 102 (or another device) may be described as collecting data corresponding to surrounding vehicles. This data may be collected without associated identifiable information from these surrounding vehicles (e.g., without license plate numbers, make, model, and the color of the surrounding vehicles). Accordingly, the techniques mentioned here can because for the beneficial purposes described, but without the need to store potentially sensitive information of the surrounding vehicles.

Figure 2:
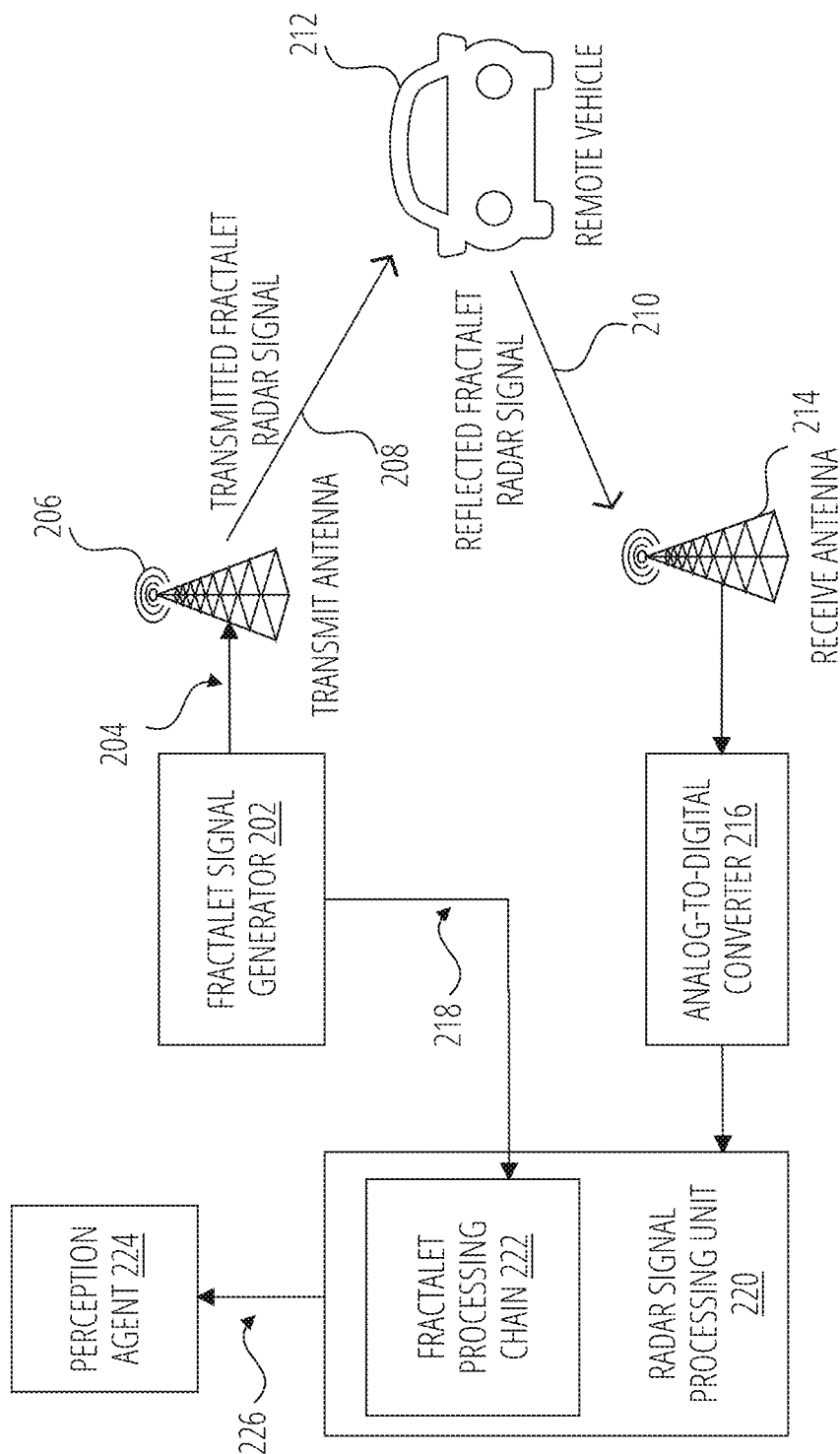
FIG. 2 a block diagram of an example automotive radar system illustrating transmit and receive capability.

FIG. 2 a block diagram of an example fractalet-based automotive radar system illustrating transmit and receive capability. The radar system of FIG. 2 can be, for example, one of sensor systems 108 in autonomous vehicle 102. In other examples, the automotive radar system of FIG. 2 can be part of a human-operated vehicle having an ADAS that can utilize various sensors including radar sensors.

Fractalet signal generator 202 can be, for example, a signal generator that produces a fractalet RADAR signal to be transmitted from, for example, a host platform (e.g., autonomous vehicle 102, human operated ADAS vehicle, automated delivery vehicle). An example fractalet RADAR waveform is illustrated in FIG. 4 and, in contrast, a conventional frequency-modulated continuous wave (FMCW) RADAR signal is illustrated in FIG. 3. An example fractalet signal generator is described in greater detail in FIG. 5.

The signal generated by fractalet signal generator 202 provides a fractalet radar frequency signal to be transmitted by transmit antenna 206 (which can be a single antenna or an antenna array) as transmitted fractalet RADAR signal 208. In an example, transmit antenna 206 is a fractal antenna that can have similar transmission characteristics at all frequencies of interest. Transmitted fractalet RADAR signal 208 can be reflected by a remote object, for example, remote vehicle 212. Reflected fractalet RADAR signal 210 is detected by receive antenna 214, which can be a single antenna or an antenna array.

Baseline reference signals 218 (described in greater detail with respect to FIG. 5) are transmitted from fractalet signal generator 202 to heterodyne receivers of fractalet processing chain 222 in RADAR signal processing unit 220 to allow correlation and processing of the received signals. In an example, baseline reference signals 218 are the same as (or very similar to) fractalet radar frequency signal 204. Reflected fractalet RADAR signal 210 from receive antenna 214 are digitized by analog-to-digital converter 216 to generate digital RADAR waveforms that are transmitted to RADAR signal processing unit 220.

RADAR signal processing unit 220 can provide information to perception agent 224 in the form of multifrequency point cloud 226, which can be utilized to control an autonomous vehicle or to provide driver feedback and/or assistance in an ADAS environment. An example fractalet processing chain is described in greater detail with respect to FIG. 5.

FIG. 3 illustrates an example frequency-modulated continuous wave (FMCW) RADAR signal. FMCW RADAR signals are a series of chirps, which are sinusoid signals having frequencies that sweep from a pre-selected minimum frequency to a pre-selected maximum frequency. Various hardware architectures exist to generate FMCW RADAR signals.

In the example of FIG. 3 FMCW signal 302 is illustrated with voltage on the vertical axis and time on the horizontal axis. As illustrated, FMCW signal 302 has a relative maximum voltage of 1 (corresponding to the maximum voltage swing) and a relative minimum voltage of −1 (corresponding to the minimum voltage swing). Any actual maximum and minimum voltage can be supported. The example of FMCW signal 302 conceptually illustrates a specific frequency sweep; however, other frequency sweeps can also be supported.

FIG. 4 illustrates an example fractalet RADAR signal. The example fractalet RADAR signal provides an increased frequency content as compared to the FMCW RADAR signal. The fractalet RADAR waveform includes signals for the various frequency ranges supported with no multiplexing (either in time or in phase). An example architecture for generating fractalet signal 402 is provided in FIG. 5.

In the example of FIG. 4 fractalet signal 402 is illustrated with voltage on the vertical axis and time on the horizontal axis. As illustrated, fractalet signal 402 has a relative maximum voltage of 3 (corresponding to the maximum voltage swing) and a relative minimum voltage of −3 (corresponding to the minimum voltage swing) because, in the example of FIG. 4, three signals are combined. Any actual maximum and minimum voltage can be supported by combining different number of signals. The example of fractalet signal 402 conceptually illustrates a specific frequency sweep; however, other frequency sweeps can also be supported.

Figure 5:
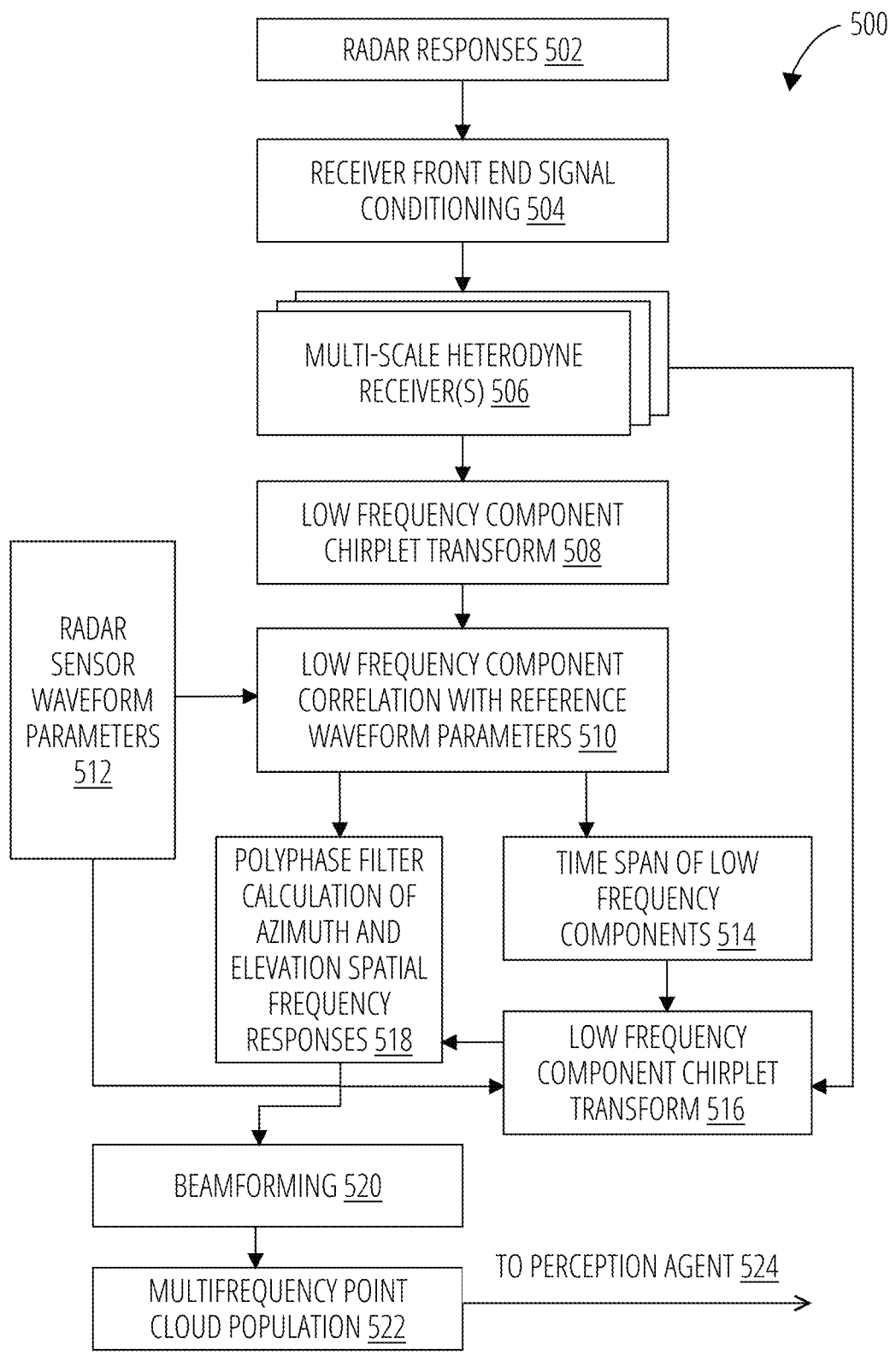
FIG. 5 is a block diagram of an example fractalet RADAR processing chain.

FIG. 5 is a block diagram of an example RADAR fractalet processing chain. Fractalet RADAR signal processing architecture 500 as illustrated in FIG. 5 can be, for example, fractalet processing chain 222, RADAR signal processing unit 220, analog-to-digital converter 216 and receive antenna 214 of FIG. 2.

RADAR responses 502 are received by one or more antennae and are provided to receiver front end signal conditioning 504. RADAR responses 502 can be reflected fractalet RADAR signals (e.g., reflected fractalet RADAR signal 210). Various conditioning techniques can be applied in receiver front end signal conditioning 504.

Because RADAR responses 502 are fractalet RADAR waveforms, high-frequency signals are embedded in the low-frequency signal. The general signal processing approach described with respect to FIG. 5 is to extract the low frequency components and compare the extracted low frequency components with a reference signal to determine interference and then extract the high frequency signal from the low frequency signal. In an example, polyphase filtering (e.g., polyphase filter calculation of azimuth and elevation spatial frequency responses 518) is used (both azimuth and elevation) on the extracted high-frequency signal to find peaks in the spatial frequency domain. Fourier techniques may be ineffective because of alignment issues.

In an example, multi-scale heterodyne receiver(s) 506 decode the conditioned waveform output from receiver front end signal conditioning 504. For the low frequency bands, multi-scale heterodyne receiver(s) 506 demodulate the received signal by extracting the modulating frequency from its corresponding band. The demodulated signals are sampled, and the chirplet transforms of each frequency band are calculated via low frequency component chirplet transform 508.

In general, a chirp is a signal having a frequency that increases with time (as illustrated in FIG. 3) or decreases with time. A chirp signal can also be referred to as a sweep signal. Various types of chirp signals exist including, for example, a linear-frequency chirp (or linear chirp) has a frequency that varies linearly with time. Other, non-linear chirp signals also exist.

A chirplet transform is an inner product of an input signal with analysis primitives called chirplets. Conceptually, the chirplet transform represents a rotated, sheared, or otherwise transformed tiling of the time-frequency plane.

The waveform profile of the calculated chirplet transforms at the lower frequency bands are compared (e.g., low frequency component correlation with reference waveform parameters 510) with the transmitted waveform provided (e.g., radar sensor waveform parameters 512). The time/frequency components of the lower frequency bands corresponding to the fractalet profile are stored (e.g., time span of low frequency components 514).

The signals for the higher frequency bands are extracted from the corresponding high frequency heterodyne receivers within multi-scale heterodyne receiver(s) 506. The chirplet transform of the high frequency fractalet components are extracted at the time span based on the stored time/frequency components (e.g., from time span of low frequency components 514). The chirplet transform components are transferred to polyphase filter calculation of azimuth and elevation spatial frequency responses 518 to calculate the spatial frequency components along with azimuth and elevation directions. Beamforming 520 is performed to determine the target locations. Multifrequency point cloud population 522 is generated, which can be sent to perception agent 524 (e.g., perception agent 224).

The signal processing approach described herein provides an increased ability to detect environmental clutter as compared to previous approaches. The use of lower frequencies and the waveform self-similarity allows the detection of environmental clutter responses that can cause issues at, for example, the 77 GHz frequency range (e.g., vegetation, fence structures).

Further, the signal processing approach described herein provides increased computational efficiency as compared to previous approaches. Due to the use of low frequency information to locate the time spans where the signal was detected, a much more efficient processing of the higher frequency responses is possible. This is the result of only calculating the chirplet transform of high frequency components, which is more computationally intensive, in time windows where target responses were received instead of the whole signal cycle as with previous approaches.

Additionally, the signal processing approach described herein provides a higher degree of information as compared to previous approaches. Due to the use of lower frequencies, the recorded responses are able to penetrate into structures that typical automotive radar systems are not able to penetrate (e.g., vegetation). The lower frequencies allow a higher degree of waveform diffraction that provides information from partially occluded objects. The higher frequency responses provide information about the finer details of the scene.

Figure 6:
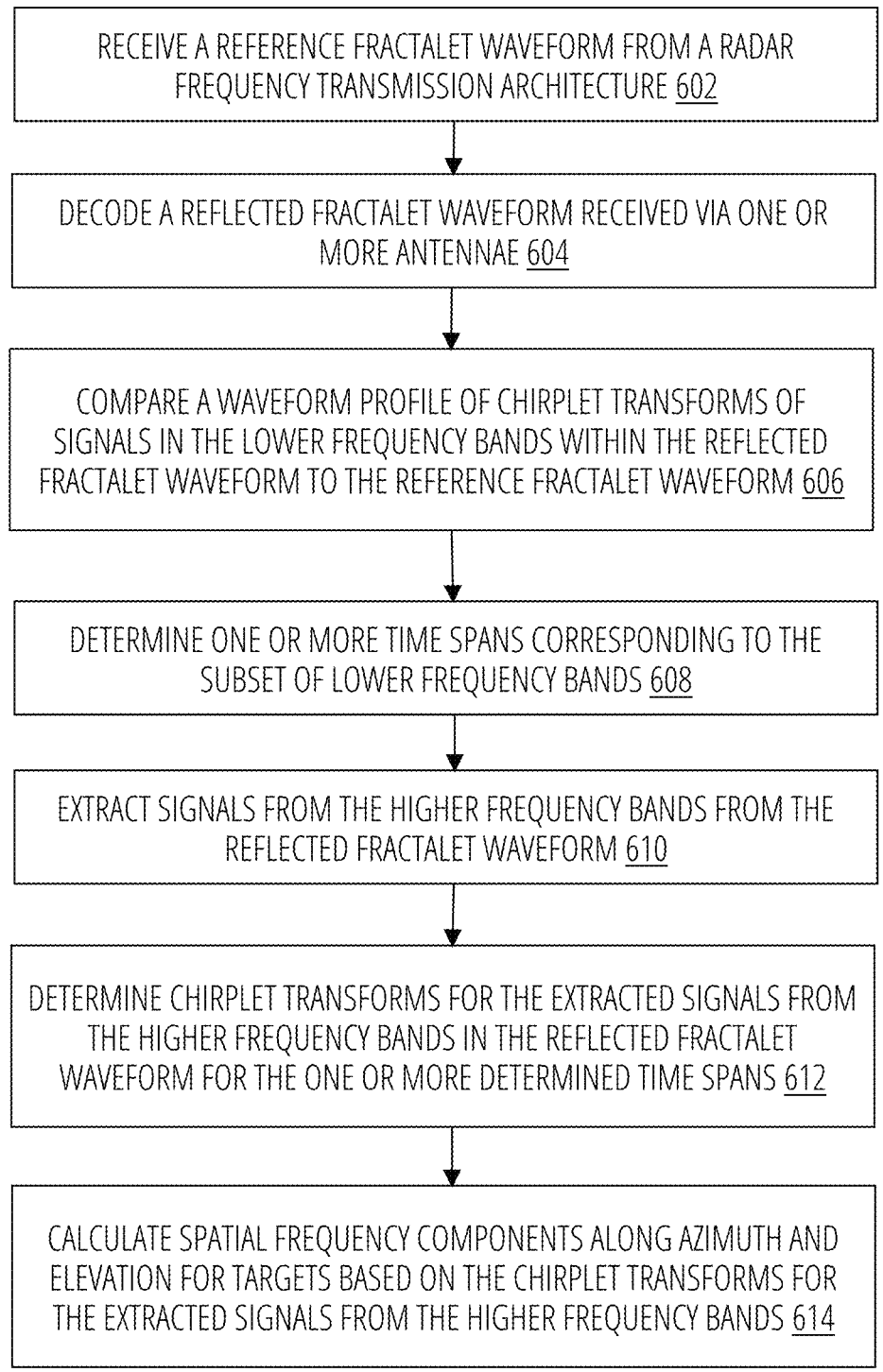
FIG. 6 is a flow diagram for one technique for processing a reflected fractalet RADAR signal.

FIG. 6 is a flow diagram for one technique for processing a reflected fractalet RADAR signal. The functionality of FIG. 6 can be provided by, for example, autonomous vehicle control systems 106 within autonomous vehicle 102, as illustrated in FIG. 1. In other examples, the functionality of FIG. 6 can be provided by systems within a human-operated vehicle having an ADAS that can utilize various sensors including camera systems and radar sensors.

A reference fractalet waveform is received from a RADAR frequency transmission architecture in block 602. In an example, the reference waveform (e.g., baseline reference signals 218) can be received from a signal generation architecture (e.g., fractalet signal generator 202) that can be part of an automotive radar system, for example. In another example, relevant characteristics of the transmitted fractalet RADAR signal can be stored in a memory accessible by the signal processing chain (e.g., RADAR signal processing unit 220).

In an example, the fractalet waveform includes self-similar waveforms comprising a first plurality of lower frequency bands and a second plurality of higher frequency bands. In an example, the fractalet RADAR frequency waveforms contain signals within higher frequency (e.g., 24 GHz and 77 GHz) bands and lower frequency (e.g., 2.45 GHz, 5 GHz, and 60 GHz IMS bands) band that are available for automotive radar system use. Additional and/or different frequency bands can also be supported with the described approach.

A reflected fractalet waveform (e.g., reflected fractalet RADAR signal 210) received via one or more antennae (e.g., receive antenna 214) is decoded in block 604. The reflected waveform can be conditioned (e.g., receiver front end signal conditioning 504) and converted to digital format (e.g., analog-to-digital converter 216). In an example, the decoding can be performed by a set of multi-scale heterodyne receivers (e.g., multi-scale heterodyne receiver(s) 506).

A waveform profile of chirplet transforms of signals in the first plurality of lower frequency bands within the reflected fractalet waveform is compared to the reference fractalet waveform in block 606. In an example, the reference fractalet waveform is received from the signal generator that generates the transmitted fractalet waveform (e.g., baseline reference signals 218).

Time spans corresponding to the subset of lower frequency bands are determined in block 608. The determined time spans can be used to identify portions of the reflected fractalet RADAR signal that correspond to data to be processed. The use of low frequency information to locate the time spans where the signal was detected results in more efficient processing of the higher frequency responses. This is the result of only calculating the chirplet transform of high frequency components in time windows where target responses were received instead of the whole signal cycle.

Signals are extracted from the second plurality of higher frequency bands from the reflected fractalet waveform in block 610. The higher frequency signals are extracted for processing to identify one or more targets in the scene. In an example, the higher frequency signals are in the 24 GHz and 77 GHz bands; however, different frequency bands can be supported.

Chirplet transforms are determined for the extracted signals from the second plurality of higher frequency bands in the reflected fractalet waveform for the one or more determined time spans in block 612. As discussed above, the time span information can be used to select portions of the reflected signal in the higher frequency bands for which chirplet transforms are performed. This is a more efficient approach than previous approaches that performed transforms for all portions of the reflected signals.

Spatial frequency components along azimuth and elevation are determined for targets based on the chirplet transforms for the extracted signals from the second plurality of higher frequency bands in block 614.

The azimuth and elevation information is used for beamforming operations to populate a multifrequency point cloud. The multifrequency point cloud can be used by a perception agent (or other component) of an autonomous vehicle to control operation of the autonomous vehicle.

Figure 7:
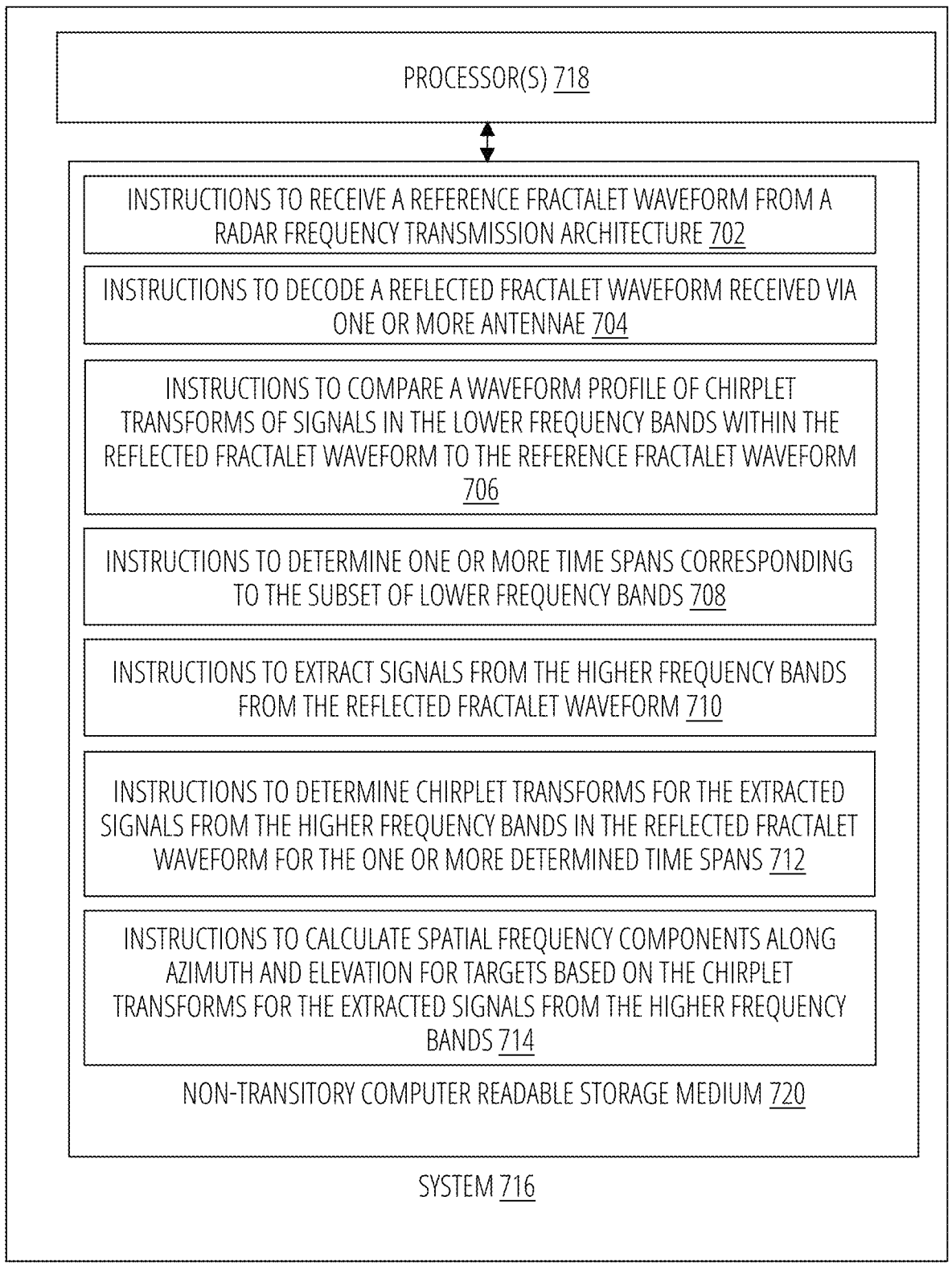
FIG. 7 is a block diagram of one example of a processing system that can provide processing of a reflected fractalet RADAR signal.

FIG. 7 is a block diagram of one example of a processing system that can provide processing of a reflected fractalet RADAR signal. In one example, system 716 can be part of an autonomous vehicle (e.g., autonomous vehicle 102 as part of internal computing system 124) that utilizes various sensors including radar sensors. In other examples, system 716 can be part of a human-operated vehicle having an advanced driver assistance system (ADAS) that can utilized various sensors including radar sensors.

In an example, system 716 can include processor(s) 718 and non-transitory computer readable storage medium 720. Non-transitory computer readable storage medium 720 may store instructions 702, 704, 706, 708, 712 and 714 that, when executed by processor(s) 718, cause processor(s) 718 to perform various functions. Examples of processor(s) 718 may include a microcontroller, a microprocessor, a central processing unit (CPU), a graphics processing unit (GPU), a data processing unit (DPU), an application-specific integrated circuit (ASIC), an field programmable gate array (FPGA), a system on a chip (SoC), etc. Examples of a non-transitory computer readable storage medium 720 include tangible media such as random access memory (RAM), read-only memory (ROM), electrically erasable programmable read-only memory (EEPROM), flash memory, a hard disk drive, etc.

Instructions 702 cause processor(s) 718 to receive a reference fractalet waveform from a RADAR frequency transmission architecture. In an example, the reference waveform (e.g., baseline reference signals 218) can be received from a signal generation architecture (e.g., fractalet signal generator 202) that can be part of an automotive radar system, for example. In another example, relevant characteristics of the transmitted fractalet RADAR signal can be stored in a memory accessible by the signal processing chain (e.g., RADAR signal processing unit 220).

Instructions 704 cause processor(s) 718 to decode a reflected fractalet waveform received via one or more antennae. The reflected waveform can be conditioned (e.g., receiver front end signal conditioning 504) and converted to digital format (e.g., analog-to-digital converter 216). In an example, the decoding can be performed by a set of multi-scale heterodyne receivers (e.g., multi-scale heterodyne receiver(s) 506).

Instructions 706 cause processor(s) 718 to compare a waveform profile of chirplet transforms of signals in the first plurality of lower frequency bands within the reflected fractalet waveform to the reference fractalet waveform. In an example, the reference fractalet waveform is received from the signal generator that generates the transmitted fractalet waveform (e.g., baseline reference signals 218).

Instructions 708 cause processor(s) 718 to determine one or more time spans corresponding to the subset of lower frequency bands. The determined time spans can be used to identify portions of the reflected fractalet RADAR signal that correspond to data to be processed. The use of low frequency information to locate the time spans where the signal was detected results in more efficient processing of the higher frequency responses. This is the result of only calculating the chirplet transform of high frequency components in time windows where target responses were received instead of the whole signal cycle.

Instructions 710 cause processor(s) 718 to extract signals from the higher frequency bands from the reflected fractalet waveform. The higher frequency signals are extracted for processing to identify one or more targets in the scene. In an example, the higher frequency signals are in the 24 GHz and 77 GHz bands; however, different frequency bands can be supported.

Instructions 712 cause processor(s) 718 to determine chirplet transforms for the extracted signals from the second plurality of higher frequency bands in the reflected fractalet waveform for the one or more determined time spans. As discussed above, the time span information can be used to select portions of the reflected signal in the higher frequency bands for which chirplet transforms are performed. This is a more efficient approach than previous approaches that performed transforms for all portions of the reflected signals.

Instructions 714 cause processor(s) 718 to calculate spatial frequency components along azimuth and elevation for targets based on the chirplet transforms for the extracted signals from the second plurality of higher frequency bands.

The azimuth and elevation information are used for beamforming operations to populate a multifrequency point cloud. The multifrequency point cloud can be used by a perception agent (or other component) of an autonomous vehicle to control operation of the autonomous vehicle.

In an example, a radar apparatus has a control system coupled with sensor systems and with kinematic control systems. The control system functions to receive a reference fractalet waveform from a radio detection and ranging (RADAR) frequency transmission architecture. The fractalet waveform includes self-similar waveforms having a first plurality of lower frequency bands and a second plurality of higher frequency bands. The control system further to decode a reflected fractalet waveform received via one or more antennae. The control system to compare a waveform profile of chirplet transforms of signals in the first plurality of lower frequency bands within the reflected fractalet waveform to the reference fractalet waveform. The control system further to determine one or more time spans corresponding to the subset of lower frequency bands. The control system to extract signals from the second plurality of higher frequency bands from the reflected fractalet waveform. The control system to determine chirplet transforms for the extracted signals from the second plurality of higher frequency bands in the reflected fractalet waveform for the one or more determined time spans. The control system to calculate spatial frequency components along an azimuth direction and along an elevation direction for one or more targets based on the chirplet transforms for the extracted signals from the second plurality of higher frequency bands.

In an example, the reflected fractalet waveform is decoded with a multi-scale heterodyne receiver. In an example, the signals extracted from the second plurality of higher frequency bands are extracted with a multi-scale heterodyne receiver and wherein the signals extracted from the second plurality of higher frequency bands are extracted with a multi-scale heterodyne receiver.

In an example, decoding the reflected fractalet waveform includes demodulating the reflected fractalet waveform by extracting a modulating frequency from corresponding frequency bands for each of the first plurality of lower frequency bands, sampling the demodulated reflected fractalet waveform, and calculating chirplet transforms for each of the plurality of low-frequency bands.

In an example, the first plurality of lower frequency bands comprise signals in a 2.4 GHz range and signals in a 5 GHz range, and the second plurality of higher frequency bands comprise signals in a 24 GHz range and signals in a 77 GHz range.

In an example, the control system is further to generate a multifrequency point cloud from the spatial frequency components. In an example, the control system is further to transmit the multifrequency point cloud to a perception agent.

In an example, a non-transitory computer-readable medium has stored thereon instructions that, when executed by one or more processors, are configurable to cause the one or more processors to receive a reference fractalet waveform from a radio detection and ranging (RADAR) frequency transmission architecture. The fractalet waveform includes self-similar waveforms having a first plurality of lower frequency bands and a second plurality of higher frequency bands. The instructions further cause the one or more processors to decode a reflected fractalet waveform received via one or more antennae. The instructions further cause the one or more processors to compare a waveform profile of chirplet transforms of signals in the first plurality of lower frequency bands within the reflected fractalet waveform to the reference fractalet waveform. The instructions further cause the one or more processors to determine one or more time spans corresponding to the subset of lower frequency bands. The instructions further cause the one or more processors to extract signals from the second plurality of higher frequency bands from the reflected fractalet waveform. The instructions further cause the one or more processors to determine chirplet transforms for the extracted signals from the second plurality of higher frequency bands in the reflected fractalet waveform for the one or more determined time spans. The instructions further cause the one or more processors to calculate spatial frequency components along an azimuth direction and along an elevation direction for one or more targets based on the chirplet transforms for the extracted signals from the second plurality of higher frequency bands.

In an example, the reflected fractalet waveform is decoded with a multi-scale heterodyne receiver. In an example, the signals extracted from the second plurality of higher frequency bands are extracted with a multi-scale heterodyne receiver and wherein the signals extracted from the second plurality of higher frequency bands are extracted with a multi-scale heterodyne receiver.

In an example, decoding the reflected fractalet waveform includes demodulating the reflected fractalet waveform by extracting a modulating frequency from corresponding frequency bands for each of the first plurality of lower frequency bands, sampling the demodulated reflected fractalet waveform, and calculating chirplet transforms for each of the plurality of low-frequency bands.

In an example, the first plurality of lower frequency bands comprise signals in a 2.4 GHz range and signals in a 5 GHz range, and the second plurality of higher frequency bands comprise signals in a 24 GHz range and signals in a 77 GHz range.

In an example, the instructions further cause the one or more processors to generate a multifrequency point cloud from the spatial frequency components. In an example, the instructions further cause the one or more processors to transmit the multifrequency point cloud to a perception agent.

In an example, A system includes a memory system and one or more hardware processors coupled with the memory system, the one or more processors to receive a reference fractalet waveform from a radio detection and ranging (RADAR) frequency transmission architecture. The fractalet waveform includes self-similar waveforms having a first plurality of lower frequency bands and a second plurality of higher frequency bands. The one or more processors further to decode a reflected fractalet waveform received via one or more antennae. The one or more processors to compare a waveform profile of chirplet transforms of signals in the first plurality of lower frequency bands within the reflected fractalet waveform to the reference fractalet waveform. The one or more processors further to determine one or more time spans corresponding to the subset of lower frequency bands. The one or more processors to extract signals from the second plurality of higher frequency bands from the reflected fractalet waveform. The one or more processors to determine chirplet transforms for the extracted signals from the second plurality of higher frequency bands in the reflected fractalet waveform for the one or more determined time spans. The one or more processors to calculate spatial frequency components along an azimuth direction and along an elevation direction for one or more targets based on the chirplet transforms for the extracted signals from the second plurality of higher frequency bands.

In an example, the reflected fractalet waveform is decoded with a multi-scale heterodyne receiver. In an example, the signals extracted from the second plurality of higher frequency bands are extracted with a multi-scale heterodyne receiver and wherein the signals extracted from the second plurality of higher frequency bands are extracted with a multi-scale heterodyne receiver.

In an example, decoding the reflected fractalet waveform includes demodulating the reflected fractalet waveform by extracting a modulating frequency from corresponding frequency bands for each of the first plurality of lower frequency bands, sampling the demodulated reflected fractalet waveform, and calculating chirplet transforms for each of the plurality of low-frequency bands.

In an example, the first plurality of lower frequency bands comprise signals in a 2.4 GHz range and signals in a 5 GHz range, and the second plurality of higher frequency bands comprise signals in a 24 GHz range and signals in a 77 GHz range.

In an example, the instructions further cause the one or more processors to generate a multifrequency point cloud from the spatial frequency components. In an example, the instructions further cause the one or more processors to transmit the multifrequency point cloud to a perception agent.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 720 has stored thereon data representing sequences of instructions that, when executed by a processor(s) 718, cause the processor(s) 718 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A radar apparatus comprising:
    a control system coupled with sensor systems and with kinematic control systems, the control system to:
        receive a reference fractalet waveform from a radio detection and ranging (RADAR) frequency transmission architecture, wherein the fractalet waveform includes self-similar waveforms comprising a first plurality of lower frequency bands and a second plurality of higher frequency bands;
        decode a reflected fractalet waveform received via one or more antennae;
        compare a waveform profile of chirplet transforms of signals in the first plurality of lower frequency bands within the reflected fractalet waveform to the reference fractalet waveform;
        determine one or more time spans corresponding to the subset of lower frequency bands;
        extract signals from the second plurality of higher frequency bands from the reflected fractalet waveform;
        determine chirplet transforms for the extracted signals from the second plurality of higher frequency bands in the reflected fractalet waveform for the one or more determined time spans; and
        calculate spatial frequency components along an azimuth direction and along an elevation direction for one or more targets based on the chirplet transforms for the extracted signals from the second plurality of higher frequency bands.

2. The radar apparatus of claim 1 wherein the reflected fractalet waveform is decoded with a multi-scale heterodyne receiver.

3. The radar apparatus of claim 1 wherein the signals extracted from the second plurality of higher frequency bands are extracted with a multi-scale heterodyne receiver and wherein the signals extracted from the second plurality of higher frequency bands are extracted with a multi-scale heterodyne receiver.

4. The radar apparatus of claim 1 wherein decoding the reflected fractalet waveform comprises:
    demodulating the reflected fractalet waveform by extracting a modulating frequency from corresponding frequency bands for each of the first plurality of lower frequency bands;
    sampling the demodulated reflected fractalet waveform;
    calculating chirplet transforms for each of the plurality of low-frequency bands.

5. The radar apparatus of claim 1 wherein the first plurality of lower frequency bands comprise signals in a 2.4 GHz range and signals in a 5 GHz range, and the second plurality of higher frequency bands comprise signals in a 24 GHz range and signals in a 77 GHz range.

6. The radar apparatus of claim 1 wherein the control system is further to generate a multifrequency point cloud from the spatial frequency components.

7. The radar apparatus of claim 6 wherein the control system is further to transmit the multifrequency point cloud to a perception agent.

8. A non-transitory computer-readable medium having stored thereon instructions that, when executed by one or more processors, are configurable to cause the one or more processors to:
    receive a reference fractalet waveform from a radio detection and ranging (RADAR) frequency transmission architecture, wherein the fractalet waveform includes self-similar waveforms comprising a first plurality of lower frequency bands and a second plurality of higher frequency bands;
    decode a reflected fractalet waveform received via one or more antennae;
    compare a waveform profile of chirplet transforms of signals in the first plurality of lower frequency bands within the reflected fractalet waveform to the reference fractalet waveform;
    determine one or more time spans corresponding to the subset of lower frequency bands;
    extract signals from the second plurality of higher frequency bands from the reflected fractalet waveform;
    determine chirplet transforms for the extracted signals from the second plurality of higher frequency bands in the reflected fractalet waveform for the one or more determined time spans; and
    calculate spatial frequency components along an azimuth direction and along an elevation direction for one or more targets based on the chirplet transforms for the extracted signals from the second plurality of higher frequency bands.

9. The non-transitory computer-readable medium of claim 8 wherein the reflected fractalet waveform is decoded with a multi-scale heterodyne receiver.

10. The non-transitory computer-readable medium of claim 8 wherein the signals extracted from the second plurality of higher frequency bands are extracted with a multi-scale heterodyne receiver.

11. The non-transitory computer-readable medium of claim 8 wherein decoding the reflected fractalet waveform comprises:
   demodulating the reflected fractalet waveform by extracting a modulating frequency from corresponding frequency bands for each of the first plurality of lower frequency bands;
   sampling the demodulated reflected fractalet waveform;
   calculating chirplet transforms for each of the plurality of low-frequency bands.

12. The non-transitory computer-readable medium of claim 8 wherein the first plurality of lower frequency bands comprise signals in a 2.4 GHz range and signals in a 5 GHz range, and the second plurality of higher frequency bands comprise signals in a 24 GHz range and signals in a 77 GHz range.

13. The non-transitory computer-readable medium of claim 8 further comprising instructions that, when executed by the one or more processors, cause the one or more processors to:
   generate a multifrequency point cloud from the spatial frequency components; and
   cause the one or more processors to transmit the multifrequency point cloud to a perception agent of an autonomous vehicle.

14. A system comprising:
   a memory system; and
   one or more hardware processors coupled with the memory system, the one or more processors to:
      receive a reference fractalet waveform from a radio detection and ranging (RADAR) frequency transmission architecture, wherein the fractalet waveform includes self-similar waveforms comprising a first plurality of lower frequency bands and a second plurality of higher frequency bands;
      decode a reflected fractalet waveform received via one or more antennae;
      compare a waveform profile of chirplet transforms of signals in the first plurality of lower frequency bands within the reflected fractalet waveform to the reference fractalet waveform;
      determine one or more time spans corresponding to the subset of lower frequency bands;
      extract signals from the second plurality of higher frequency bands from the reflected fractalet waveform;
      determine chirplet transforms for the extracted signals from the second plurality of higher frequency bands in the reflected fractalet waveform for the one or more determined time spans; and
      calculate spatial frequency components along an azimuth direction and along an elevation direction for one or more targets based on the chirplet transforms for the extracted signals from the second plurality of higher frequency bands.

15. The system of claim 14 wherein the reflected fractalet waveform is decoded with a multi-scale heterodyne receiver.

16. The system of claim 14 wherein the reflected fractalet waveform is decoded with a multi-scale heterodyne receiver.

17. The system of claim 14 wherein the signals extracted from the second plurality of higher frequency bands are extracted with a multi-scale heterodyne receiver.

18. The system of claim 14 wherein decoding the reflected fractalet waveform comprises:
   demodulating the reflected fractalet waveform by extracting a modulating frequency from corresponding frequency bands for each of the first plurality of lower frequency bands;
   sampling the demodulated reflected fractalet waveform;
   calculating chirplet transforms for each of the plurality of low-frequency bands.

19. The system of claim 14 wherein the first plurality of lower frequency bands comprise signals in a 2.4 GHz range and signals in a 5 GHz range, and the second plurality of higher frequency bands comprise signals in a 24 GHz range and signals in a 77 GHz range.

20. The system of claim 14 wherein the one or more processors are further to generate a multifrequency point cloud from the spatial frequency components.

21. The system of claim 20 wherein the one or more processors are further to transmit the multifrequency point cloud to a perception agent of an autonomous vehicle.

* * * * *